(12) United States Patent
Mori et al.

(10) Patent No.: US 6,674,556 B1
(45) Date of Patent: Jan. 6, 2004

(54) IMAGE RECONSTRUCTING APPARATUS, HOLOGRAM FORMING METHOD, HOLOGRAM AND HOLOGRAM SHEET

(75) Inventors: Shigeru Mori, Kanagawa (JP); Akira Shirakura, Tokyo (JP); Nobuhiro Kihara, Kanagawa (JP); Takahiro Toyoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/710,431

(22) Filed: Nov. 9, 2000

(30) Foreign Application Priority Data

Nov. 12, 1999 (JP) .............................. 11-323445

(51) Int. Cl.[7] .............................. G03H 1/22; G03H 1/26; G03H 1/00
(52) U.S. Cl. .............................. 359/32; 359/33; 359/22; 359/2; 359/15
(58) Field of Search .............................. 359/1, 22, 23, 359/24, 32, 33, 35, 2

(56) References Cited

U.S. PATENT DOCUMENTS

| | | | | |
|---|---|---|---|---|
| 4,445,749 A | * | 5/1984 | Benton | 359/23 |
| 4,834,476 A | * | 5/1989 | Benton | 359/23 |
| 5,296,948 A | * | 3/1994 | Chen et al. | 359/32 |
| 5,570,207 A | * | 10/1996 | Chang | 359/2 |

FOREIGN PATENT DOCUMENTS

JP          5-11678      *  1/1993  ............ G03H/1/22

* cited by examiner

*Primary Examiner*—Audrey Chang
(74) *Attorney, Agent, or Firm*—Frommer Lawrence & Haug LLP; William S. Frommer; Stephen J. Lieb

(57) ABSTRACT

In an image reconstructing apparatus 10 for reconstructing a hologram, when a lid 11 is nearly upright in relation to an apparatus body 12, a light emitted from an illumination light source 15 is projected at a predetermined angle of incidence to a hologram 17a placed on a mount surface 16a of a holder 16 of the apparatus body 12 while the light source 15 is being moved.

10 Claims, 10 Drawing Sheets

US 6,674,556 B1

IMAGE RECONSTRUCTING APPARATUS, HOLOGRAM FORMING METHOD, HOLOGRAM AND HOLOGRAM SHEET

BACKGROUND OF THE INVENTION

1. Field of the Invention

The present invention relates to an image reconstructing apparatus to reproduce or reconstruct an image by illuminating a hologram or holographic stereogram with an illumination light, a hologram forming method in which a view transform suitable for a light source used in the image reconstructing apparatus to form a hologram to form a hologram, a hologram formed by the hologram forming method, and also to a hologram sheet including a sheet on which a hologram is attached and adapted to limit the direction of the hologram in relation to the light source of the image reconstructing apparatus.

2. Description of the Related Art

A holographic stereogram is produced by sequentially recording many images formed by sequentially photographing an object from different points of view, as rectangular or dot-like element holograms on a single hologram recording medium.

Referring now to FIG. 1, there is shown a conventional method for forming holographic stereogram. For example, to form a holographic stereogram having parallax information only in the horizontal direction, first an object 100 is photographed sequentially from different points of view to provide a sequence of parallax images 101 formed from a plurality of images having the parallax information in the horizontal direction. Then, images 102 in the sequence of parallax images 101 are sequentially recorded as rectangular element holograms in a hologram recording medium 103 so that the parallax images will be in succession in the horizontal direction. Thus, a holographic stereogram having the parallax information in the horizontal direction is provided.

In the holographic stereogram, the information of the plurality of images 102 obtained by sequentially photographing the object from different horizontal points of view are sequentially recorded as rectangular element holograms so that they are in succession in the horizontal direction. So, when the holographic stereogram is viewed by the viewer with his or her both eyes, different two-dimensional images will be incident upon the right and left eyes, respectively. Thus, the viewer will feel a parallax and a three-dimensional image will be reconstructed.

In the conventional hologram reconstructing apparatus, the illumination light source for reconstructing a three-dimensional image is provided spatially apart from a hologram. So, a wide space is required for reconstruction of a conventional hologram, and the geometric relation between the hologram and illumination light source has to be set to meet specified requirements to reconstruct the hologram under optimum condition. This is also true for a hologram stereogram consisting of a plurality of element holograms.

On the other hand, if the illumination light source and hologram are integral with each other, the geometric relation between the hologram and illumination light source is always constant so that the hologram can always be reconstructed under optimum conditions.

Referring now to FIG. 2, there is shown a hologram viewing stand (HOLOSPOT4511 by Chuuou Seiki) which was designed and manufactured based on the above concept and is currently commercially available. In FIG. 2, the hologram viewing stand is generally indicated with a reference 110. The hologram viewing stand 110 includes an illumination light source 111 and hologram holder 112. A hologram or holographic stereogram 113 held on the hologram holder 112 is illuminated with an illumination light emitted from the illumination light source 111. The hologram viewing stand 110 is designed such that the light from the illumination light source 110 can always be incident upon the hologram or holographic stereogram 113 at an optimum incident angle.

However, it is desirable that a hologram or holographic stereogram can freely be viewed everywhere, not in a limited place. Therefore, an image reconstructing apparatus for reconstructing a hologram or holographic stereogram is desired to be highly portable and easy to carry on.

However, the conventional hologram viewing stand 110 is of a large stationary type. As shown in FIG. 2, since the illumination light source 111 is projected from the apparatus body, the stand 110 itself is not easily portable.

Also, when the stationary-type hologram viewing stand 110 is carried on, the geometric relation between the light source 111 and hologram holder 112 may possibly be changed so that the hologram or holographic stereogram 113 held on the hologram holder 112 cannot be reconstructed under optimum conditions.

To overcome the above-mentioned drawbacks of the prior art, a hologram reconstructing apparatus has been proposed which is compact and highly portable and in which the hologram is illuminated with an illumination light at an optimum angle of incidence. For changing the angle of visibility with the illumination light source kept optimized in relation to the hologram, however, the hologram itself has to be tilted horizontally or vertically.

Also, when viewing a hologram with a portable light source, it is difficult to move the hologram while the light source kept at a proper angle in relation to the hologram. As the result, it is not possible to assure a high quality of the hologram viewing.

OBJECT AND SUMMARY OF THE INVENTION

Accordingly, the present invention has an object to overcome the abovementioned drawbacks of the prior art by providing an image reconstructing apparatus permitting to view a hologram with a high accuracy.

The present invention has another object to provide a method for forming a hologram suitable for viewing with the above image reconstructing apparatus, and a hologram formed by this method.

The present invention has still another object to provide a hologram sheet permitting a high quality of hologram viewing with the above image reconstructing apparatus.

The above object can be attained by providing an image reconstructing apparatus for reconstructing a hologram image, including according to the present invention:

an apparatus body provided with a holder for holding a hologram; and a moving light source movable while keeping a predetermined angle of incidence in relation to the hologram held on the holder.

Also the above object can be attained by providing a hologram forming method for forming a hologram by recording a plurality of element holograms on a hologram recording medium, wherein, according to the present invention:

based on the moving locus of a light source to illuminate a hologram with a light for reconstruction of the hologram, a view transform is done to convert data in a parallax image train composed of a plurality of images including parallax information to a new parallax image train on which the element holograms are based.

Also the above object can be attained by providing a hologram formed by recording a plurality of element holograms on a hologram recording medium, wherein according to the present invention, based on the locus of movement of a light source to illuminate a hologram with a light for reconstruction of the hologram, a view transform was made to convert data in a parallax image train composed of a plurality of images including parallax information to a new parallax image train on which the element holograms are based.

Also the above object can be attained by providing a hologram sheet having a hologram attached in a predetermined area thereof, arranged, according to the present invention, to limit the direction in which the hologram is placed in relation to the hologram reconstructing apparatus based on the incident direction of a light from a light source provided in the hologram reconstructing apparatus.

These objects and other objects, features and advantages of the present intention will become more apparent from the following detailed description of the preferred embodiments of the present invention when taken in conjunction with the accompanying drawings. It should be noted that the present invention is not limited to the embodiments but can freely be modified without departing from the scope and spirit thereof defined in the claims given later.

DETAILED DESCRIPTION OF THE PREFERRED EMBODIMENTS

Referring now to FIGS. 3 to 7, there will be described the first embodiment of the image reconstructing apparatus according to the present invention. The image reconstructing apparatus is generally indicated with a reference 10. As shown, the image reconstructing apparatus 10 includes an apparatus body 12 and a lid 11 movably installed on the apparatus body 12.

Figure 1:
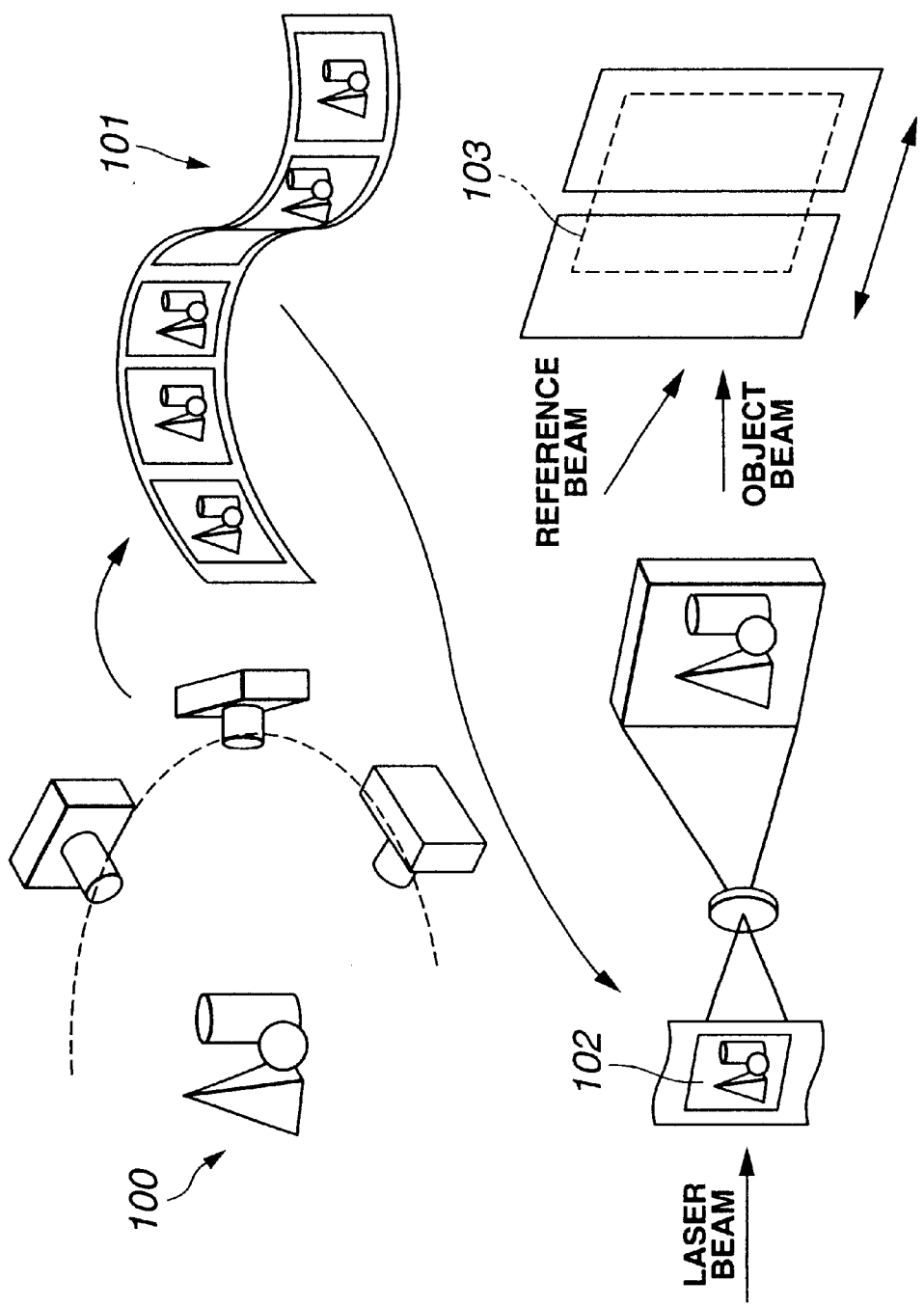
FIG. 1 explains the conventional method for forming holographic stereogram.
Figure 2:
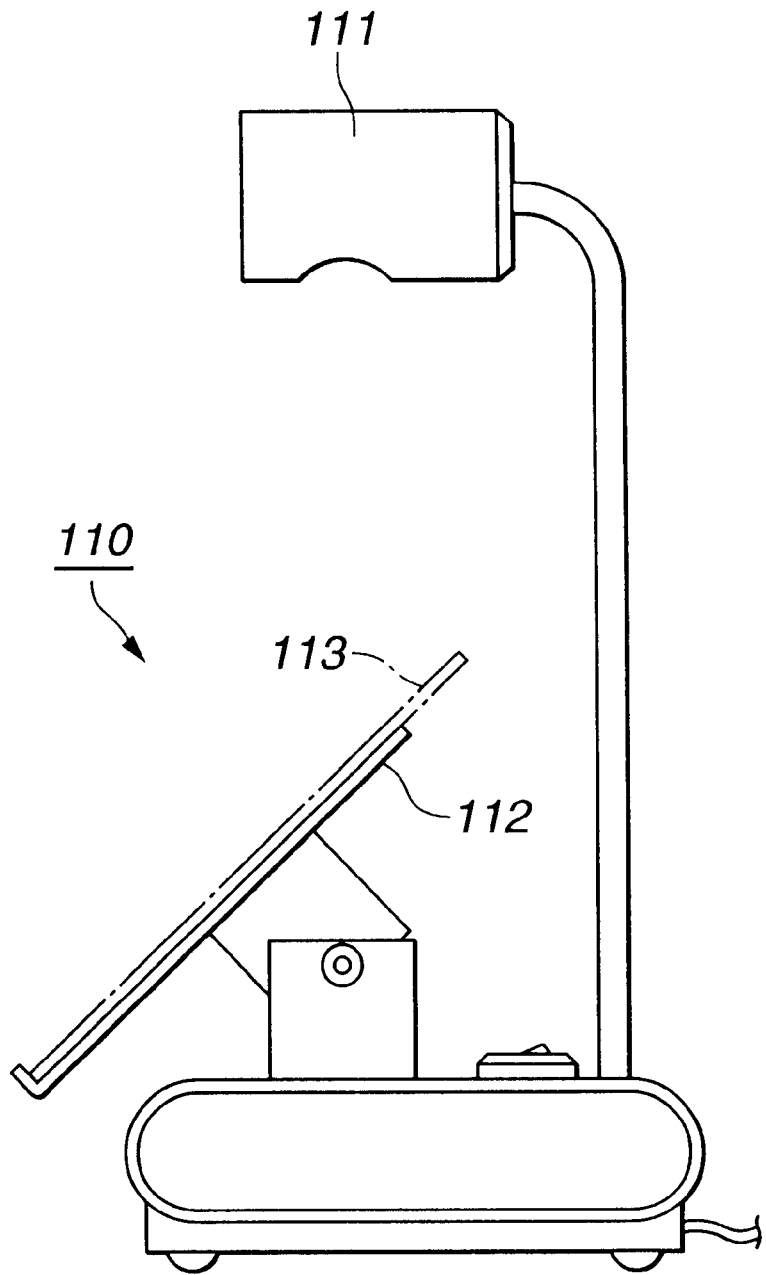
FIG. 2 is an external view of a conventional hologram viewing stand.
Figure 3:
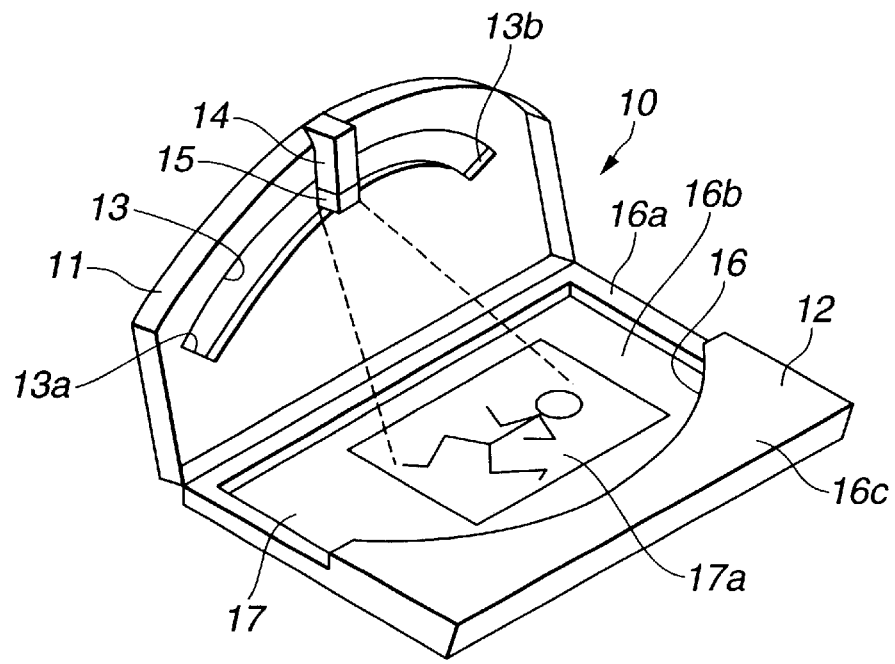
FIG. 3 is a perspective view of a first embodiment of the image reconstructing apparatus according to the present invention, showing the lid is opened from the apparatus body to a nearly upright position.
Figure 4:
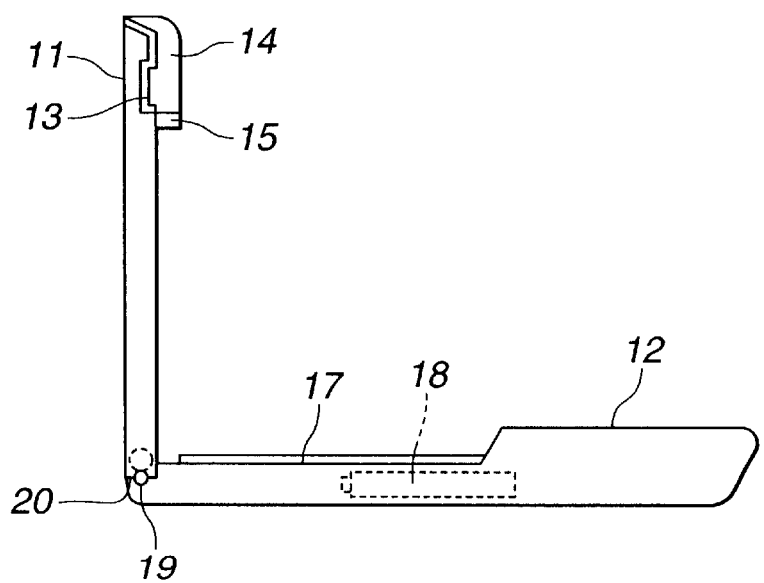
FIG. 4 is a side elevation of the image reconstructing apparatus in FIG. 3.
Figure 5:
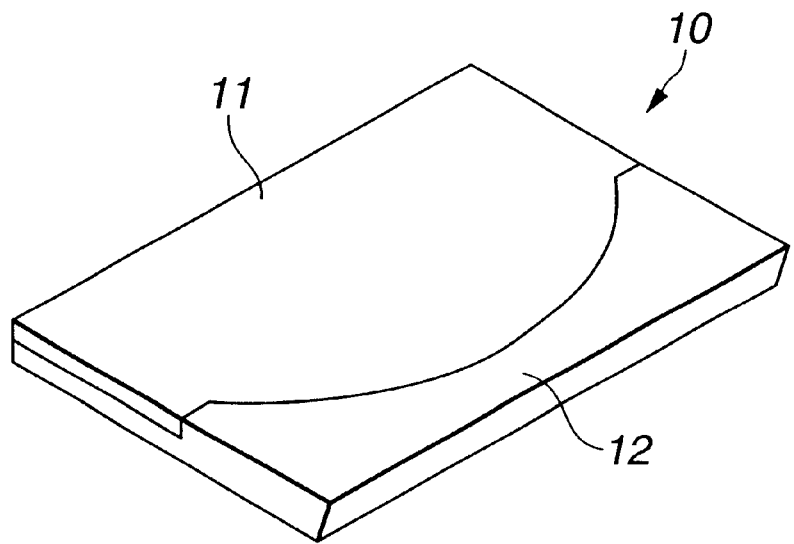
FIG. 5 is an external view of the image reconstructing apparatus in FIG. 3, showing the lid is closed to the apparatus body.
Figure 6:
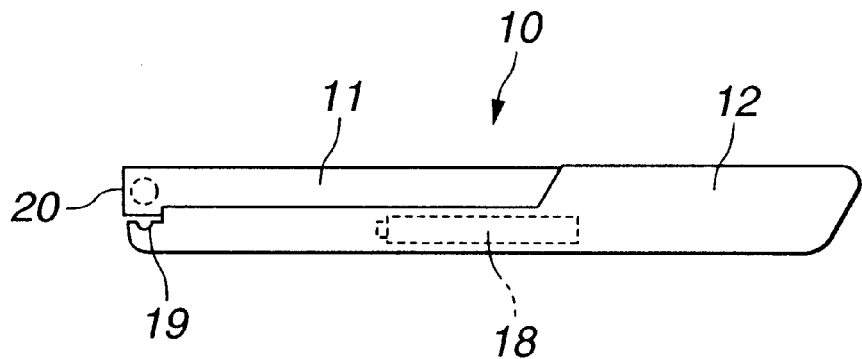
FIG. 6 is an side elevation of the image reconstructing apparatus in FIG. 5.

FIGS. 3 and 4 are a perspective view and a side elevation, respectively, of the image reconstructing apparatus 10, showing the lid 11 opened from the apparatus body 12 to a nearly upright position. FIGS. 5 and 6 are an external view and a side elevation, respectively, of the image reconstructing apparatus 10, showing the lid 11 closed to the apparatus body 12.

The apparatus body 12 includes a holder 16 which is concave to hole a hologram sheet 17 on which a hologram 17a is attached. The holder 16 has formed thereon a mount surface 16a on which the hologram sheet 17 is placed. The holder 16 has also a step 16c forming a part of the apparatus body 12, in which an insertion space 16b is formed. In the insertion space 16b, the hologram 17a is exposed and about one third of the hologram sheet 17 can be inserted. The insertion space 16b is formed to a height larger than the thickness of the hologram sheet 17. Also the insertion space 16b may be formed such that a stack of few hologram sheets 17 can be inserted and held there. The step 16c is formed to be flush with the outer surface of the lid 11 when the lid 11 is closed to the concavity of the apparatus body 12. The lid will further be described later. In the concavity formed inside the apparatus body 12, there is housed a battery 18 to energize an illumination light source 15 which will further be described later.

The lid 11 is installed to the apparatus body 12 pivotably between a first position where the lid 11 is closed to the apparatus body 12 and a second position where the lid 11 takes a nearly upright posture. In the image reconstructing apparatus 10, when the lid 11 is in the second position, an illumination light emitted from the illumination light source 15 is projected to the hologram 17a placed on the mount surface 16a of the holder 16 of the apparatus body 12 at a predetermined angle of incidence while the light source 15 is being moved.

The lid 11 has provided on the side thereof at which it is installed to the apparatus body 12, a positioning projection 20 to position and lock the lid 11 at the second position. Also, the apparatus body 12 has formed near the pivot shaft thereof a positioning concavity 19 in which the positioning projection 20 on the lid 12 is fitted when the lid 11 is pivoted up to the second position.

In the image reconstructing apparatus 10, when the lid 11 is pivoted up to the second position, the positioning projection 20 provided on the lid 11 is fitted into the positioning concavity 19 formed in the apparatus body 12. Thus, the lid 11 is correctly positioned and kept erected at the second position. Therefore, in the image reconstructing apparatus 10, when the hologram 17a placed on the mount surface 16a of the holder 16 is viewed, the hologram 17a and illumination light source 15 are held in an optimum geometric relation so that the illumination light from the illumination light source 15 can always be projected onto the hologram 17a at an appropriate angle of incidence.

Further, the lid 11 has provided on the side thereof installed to the apparatus body 12 a connecting terminal which forms a switching mechanism by which a power from the battery 18 housed inside the apparatus body 12 is connected to or disconnected from the illumination light source 15. The connecting terminal is provided at either side, right and left, for example, of the positioning projection 20. Also, there is provided a connecting terminal at either side, right and left, of the positioning concavity 19 in the apparatus body 12. These connecting terminals are located correspondingly to the above-mentioned connecting terminals provided on the lid 11, and form along with the latter connecting terminals the switching mechanism. Thus, when the lid 11 is pivoted and locked at the second position in relation to the apparatus body 12, the mating ones of the connecting terminals are put into contact with each other to supply the power from the battery 18 housed in the apparatus body 12 to the illumination light source 15 provided on the lid 11. When the lid 11 is closed to the apparatus body 12, the connecting terminals leave each other so the power is disconnected.

Namely, the lid 11 serves as a light source holder also. The light source 15 is held movably on a moving mechanism which will further be described later. The light source 15 is provided on a lever 14 which is an essential part of the moving mechanism. The lever 14 has the general form of an inverted "L". It is so installed so that when the lid 11 is pivoted to the nearly upright position in relation to the apparatus body 12 (second position), the light source 15 will illuminate the hologram 17a placed on the mount surface 16a of the holder 16. Below the end of the lever 14 at which the light source 15 is installed, there is provided a fitted-type lead to move the light source 15 along an arcuate recess 13 formed on the lid 11. The other end of the lever 14 serves as a knob/switch.

When the knob/switch portion of the lever 14 is pressed, the power is supplied from the battery 18 to the illumination light source 15 which will thus be turned on. By sliding the lever 14 along the recess 13, the light source 15 can be slide along with the lever 14 since it is interlocked with the latter by means of the moving mechanism. The recess 13 is formed to be arcuate as mentioned above from the beginning end (left) 13a towards the trailing end (right) 13b. Thus as the lever 14 is moved along the arcuate recess 13, the light source 15 is also moved depicting an arcuate locus. To move the lever 14 from the beginning end 13a to the trailing end 13b, the lever 14 should be applied with a force against the force of a spring connected to the lever 14. Therefore, when the lever 14 is released when it is at a midway to the trailing end 13b or at the trailing end 13b, it will return to the beginning end 13a with the spring force being controlled by a damper. The light source 15 is kept turned on until the lever 14 returns to the beginning end 13a.

Figure 7:
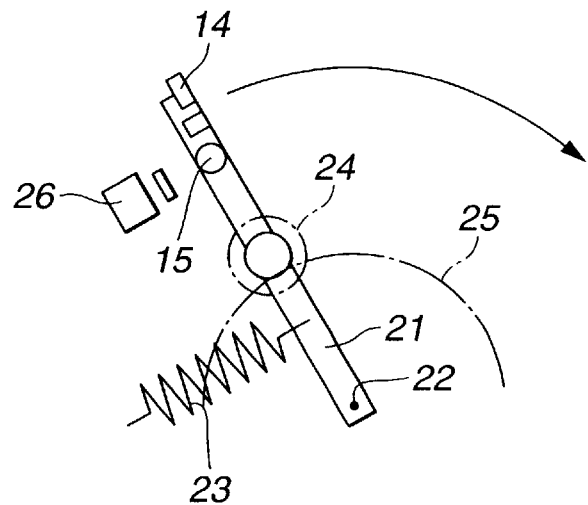
FIG. 7 shows the illumination light source moving mechanism provided in the image reconstructing apparatus in FIG. 3.

FIG. 7 shows the moving mechanism to move the illumination light source 15. As shown, the lever 14 is formed from a plate 21 resting at a fulcrum 22. A spring 23 is connected at one end thereof to a portion, a little lower than the center, of the plate 21, and at the other end to a predetermined point inside the lid 11. There is provided in the center of the plate 21 a damper 24 to control the force of the spring 23, applied to the plate 21. There is also provided a switch 26 to turn on and off the illumination light source 15. When the plate 22 goes out of its initial state, the switch 26 turns on the light source 15. When the plate 22 returns to the initial state, the switch 26 turns off the light source 15.

The light source 15 can be moved manually from the beginning end 13a to the trailing end 13b. However, it should be noted that the light source 15 may be adapted to be so movable automatically by a motor or the like.

As shown in FIG. 3, the hologram 17a attached on the hologram sheet 17 has to be placed on the mount surface 16a so that the light from the source 15 is incident upon the hologram 17a longitudinally of the element holograms as will further be described later. To this end, the illumination light source 15 is moved in a direction(perpendicular to the length of the element holograms recorded in the hologram 17a while the light from the source 15 is being incident upon the hologram 17a longitudinally of the element holograms.

Normally, one hologram sheet 17 is placed on the mount surface 16a. However, a plurality of hologram sheets 17 may be placed on the mount surface 16a since the insertion space 16b is formed to have such a height as to accommodate more than one hologram sheet 17 as having previously been described. With a plurality of hologram sheets 17 placed on the mount surface 16a, a top one of them is viewed and removed after the viewing, and a next top one can be viewed. For the convenience of such viewing of a plurality of holograms, a hologram pressing means such as a leaf spring may be provided under the mount surface 16a to force a plurality of holograms upwards for sequential viewing.

As having been described in the foregoing, the hologram sheet 17 is just placed on the mount surface 16a of the holder 16 for viewing. The hologram 17a is illuminated with a light from the light source 15 disposed in an optimum position and at an optimum angle in relation to the hologram 17a for a high quality of the hologram viewing. Conventionally, the hologram sheet 17 itself is moved for enjoying to view a change of a plurality of holographic images printed on the hologram sheet 17 from one to another. With the image reconstructing apparatus 10 according to the present invention, however, the illumination light source 15 is moved in the direction perpendicular to the element holograms recorded in a hologram 17 while illuminating the hologram 17 longitudinally of the element holograms. The angular relation between the hologram 17 and the illumination light incident upon the hologram 17 is changed for enjoying to see a change such as a motion of the hologram.

Figure 8:
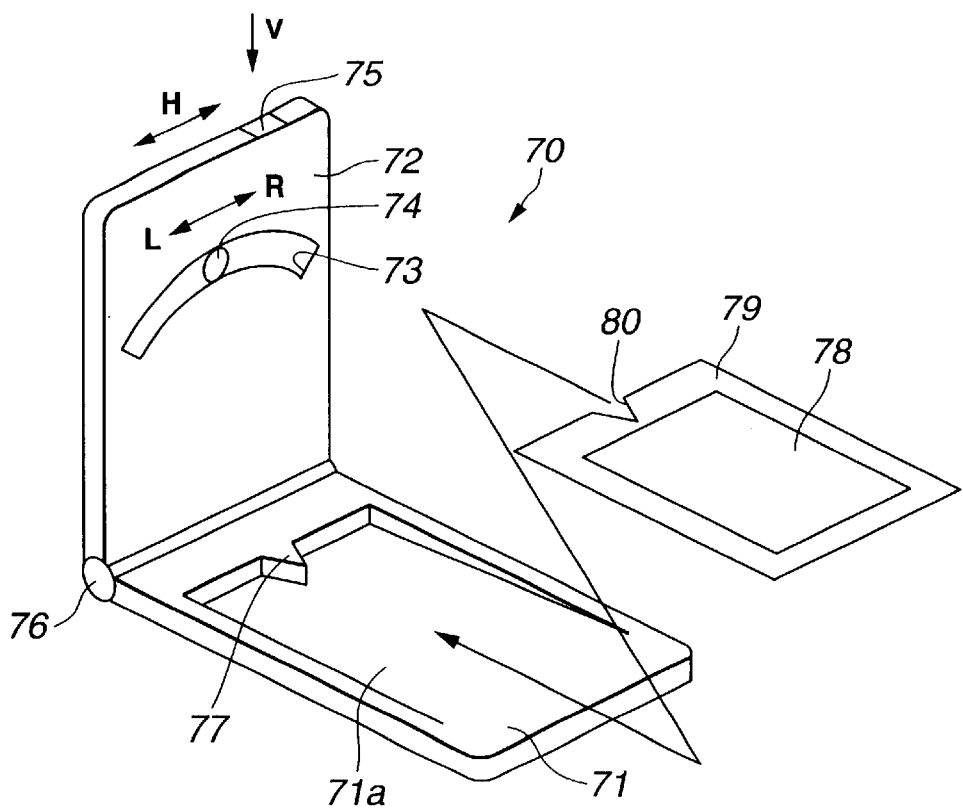
FIG. 8 is a perspective view of a second embodiment of the image reconstructing apparatus according to the present invention, showing the lid is opened from the apparatus body to a nearly upright position.

Next, the second embodiment of the image reconstructing apparatus according to the present invention will be described herebelow with reference to FIG. 8. In FIG. 8, the image reconstructing apparatus is generally indicated with a reference 70. The image recording apparatus 70 includes an apparatus body 71 and lid 72. FIG. 8 is a perspective view of the image reconstructing apparatus 70, showing the lid 72 is opened from the apparatus body 71 to a nearly upright position.

As shown, the apparatus body 71 includes a holder 71a to hold a hologram sheet 79 having a hologram 78 attached thereon. The apparatus body 71 has an internal space in which a battery (not shown) is provided. The battery supplies a power to an illumination light source 74 installed on the lid 72 via a similar connecting terminal mechanism to that shown in FIG. 3.

The lid 72 is installed to the apparatus body 71 pivotably about a pivot shaft 76 between a first position where it is closed to the apparatus body 71 and a second position where it is in a nearly upright position in relation to the apparatus body 71. In the image reconstructing apparatus 70, when the lid 72 is at the second position, a light emitted from the illumination light source 74 supplied with the power from the battery is projected to a hologram 78 placed on the holder 71 a of the apparatus body 71 at a predetermined angle of incidence while the light source 74 is being moved.

The lid 72 works also as a light source holder. It holds the illumination light source 74 provided with a moving mechanism owing to which the light source 74 is movable but which will not further be described. The illumination light source 74 is movable along an arcuate recess 73 to illuminate the hologram 78 on the holder 71a. At the end, opposite to the pivot shaft 76, of the lid 72, there is provided a knob/switch 75 to move the light source 74. When the knob/switch 75 is pressed in the direction of arrow V in order to move the light source 74, the light source 74 is supplied with the power from the battery and emits a light. When the knob/switch 75 is slid in either direction of arrow H, the illumination light source 74 interlocked with the knob/switch 75 by means of the moving mechanism can be slid in either direction of arrow, L or R.

Figure 9:
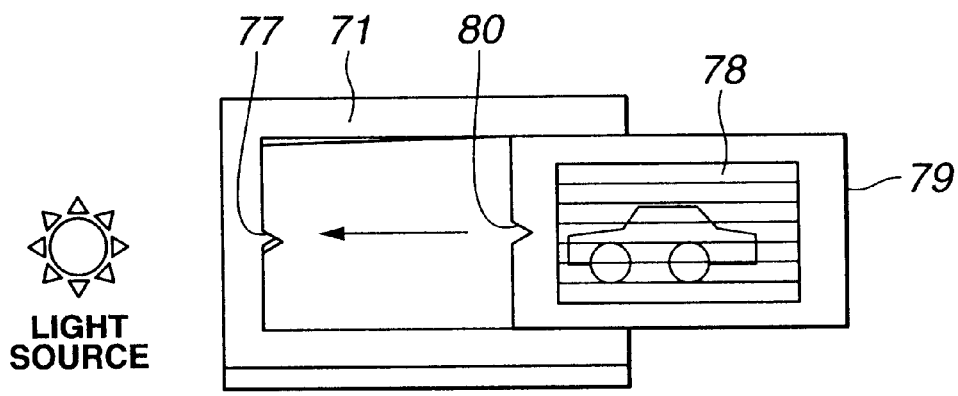
FIG. 9 explains an optimum incident direction of the illumination light in the image reconstructing apparatus in FIG. 8.
Figure 10:
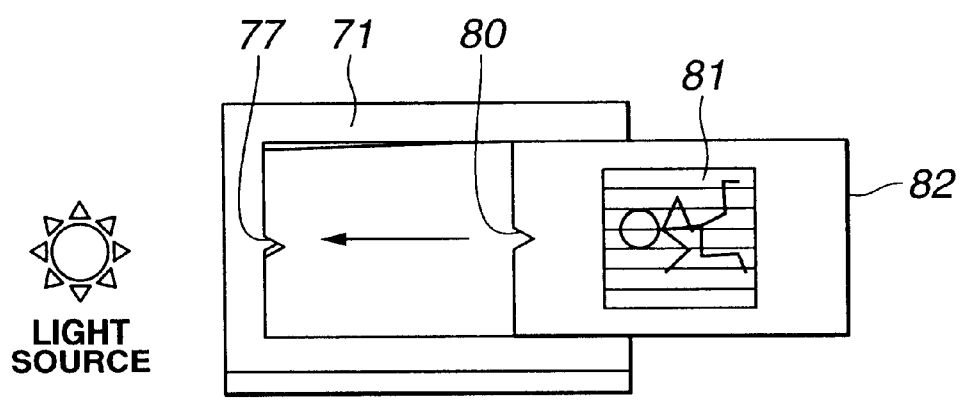
FIG. 10 also explains an optimum incident direction of the illumination light in the image reconstructing apparatus in FIG. 8.

The hologram sheet 79 can be inserted into and held in the hologram holder 71a of the apparatus body 71 only in one direction. As shown, the holder 71a has a projection 77 corresponding in shape to a cut formed in the hologram sheet 79. To correctly insert the hologram sheet 79 into the holder 71a, it is necessary to insert it so that the cut 80 in the hologram sheet 79 fits onto the projection 77. In a hologram or holographic stereogram, the optimum incident direction of the illumination light depends upon the method by which the holographic image has been formed and the application of the holographic image. Namely, the light has to be projected in the horizontal or vertical direction of the holographic image as shown in FIG. 9 or 10, respectively. In the image reconstructing apparatus 70, the illumination light can be projected to a hologram in a direction in which the hologram is recorded (in the recorded direction of element holograms) by fitting the cut 80 in the hologram sheet 79 onto the projection 77 of the holder 71a. Thus, the illumination light source 74 can be placed in an optimum position in relation to a hologram sheet whether the due direction of light projection is a horizontal direction or vertical direction of the holographic image on the holographic sheet. In FIGS. 9 and 10, the lines shown in the hologram 78 indicate the recorded (longitudinal) direction of the element holograms.

The light source 74 can be moved manually. However, it should be noted that the light source 74 may be adapted to be so movable automatically by a motor or the like. Also, the hologram on the hologram holder can be directed by fitting the cut 80 in the hologram sheet 79 onto the projection 77 of the holder 71a. However, the hologram can be directed by coinciding markings provided to this end, by forming the hologram sheet in a special shape or otherwise.

Also, to store a plurality of holograms, a hologram storage may be formed separately from the holder 71a, namely, in the surface of the holder 71a for example.

If a hologram set in the image reconstructing apparatus is exposed to any other light source such as a room illumination, sunlight or the like, a double image will be reconstructed and image contrast will be lower, so that the hologram cannot correctly be viewed. To avoid this, the image reconstructing apparatus may be provided with a foldable shading mechanism to minimize an incoming light from other than the illumination light source.

In the aforementioned two embodiments 10 and 70 of the image reconstructing apparatus according to the present invention, the illumination light is projected to the element holograms recorded in the hologram longitudinally of them. That is, a quality hologram can be provided by recording element holograms in a hologram in the direction of light projection from the illumination light source of the image reconstructing apparatus. Thus it is necessary to effect a suitable view transform of the data in the parallax image train.

The method for forming a hologram which can be reconstructed by the image reconstructing apparatus having been described in the foregoing, will be described below concerning a holographic stereogram.

Figure 11:
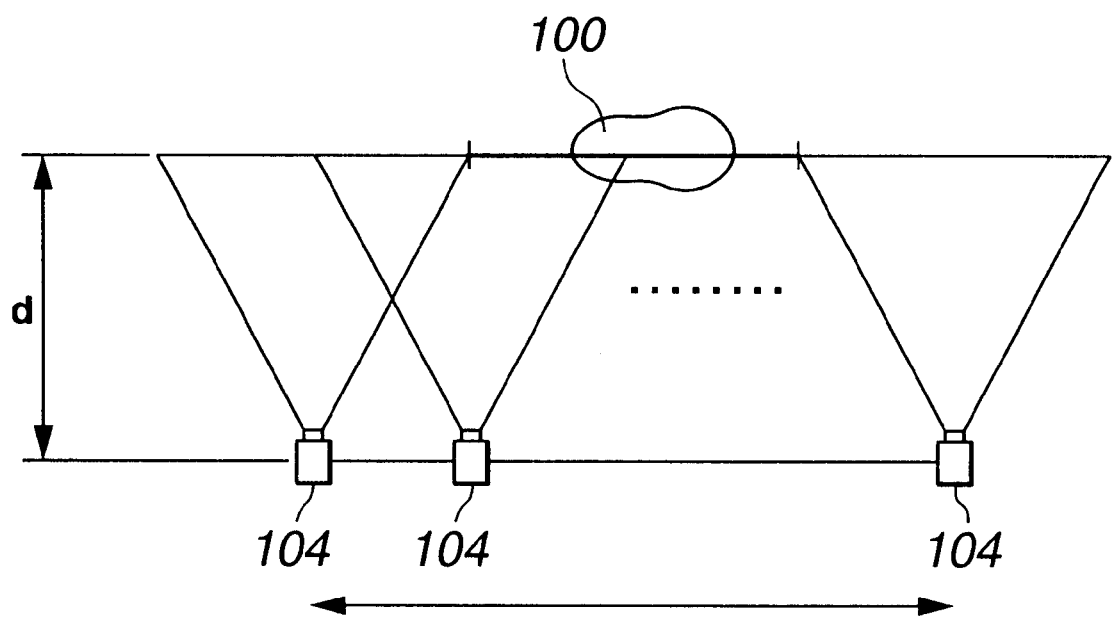
FIG. 11 explains the photography of parallax image trains by the straight track system.

Referring now to FIG. 11, there is shown the photography of parallax image trains by a straight track system. The parallax image trains from which a holographic stereogram is produced can be formed by moving a camera 104 in parallel to an object 100 for example as shown in FIG. 11 with the camera 104 directed towards the object 100 and kept constantly so directed, thereby taking many pictures of the object 100 from different positions. More specifically, the camera 104 directed towards the object 100 is moved in parallel to the object 100 from a beginning position of a photographic range of the camera 104 to an end position where the object 100 is out of the photographic range, and thus, while moving the camera 104 kept constantly directed as in the above within the photographic range, many pictures of the object 100 are taken from different angles of viewing. Thus parallax images from which a holographic stereogram is produced can be obtained. Note that this method for taking many pictures of the object 100 from different positions by moving the camera 104 in parallel to the object 100 with the camera 104 kept constantly directed as in the above is called "straight track" system.

Figure 12:
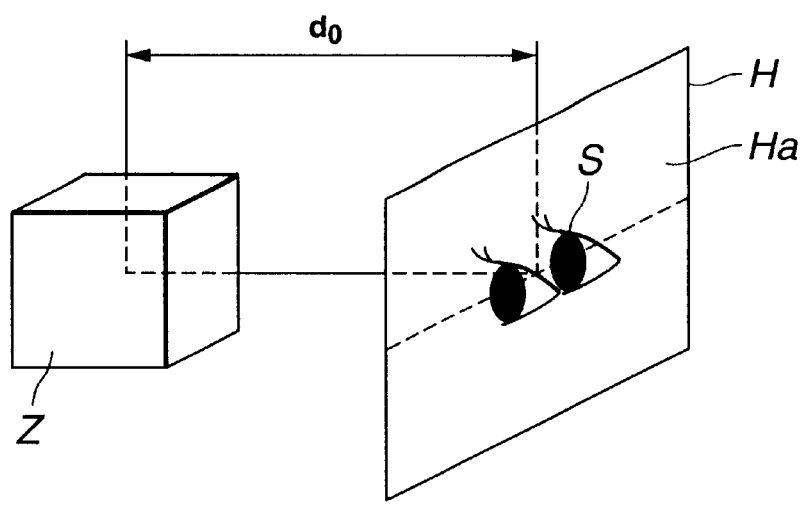
FIG. 12 explains the viewing a hologram before subjected to a view transform.

The geometric relation between the view point of the camera 104 and object 100 during the photography is held also in the holographic stereogram formed as in the above. Therefore, when a holographic stereogram H is produced from the parallax image trains captured as in the above, a reconstructed image Z will formed in a position deeper than a hologram plane Ha of the holographic stereogram H as shown in FIG. 12. Thus, unless the reconstructed image Z is viewed with the observer's view S located in the hologram plane Ha in such a manner that a distance d0 between the reconstructed image Z and observer's view S is equal to a distance d between the object 100 and view point of the camera 104 during the photography, it will appear distorted or blurred.

Figure 13:
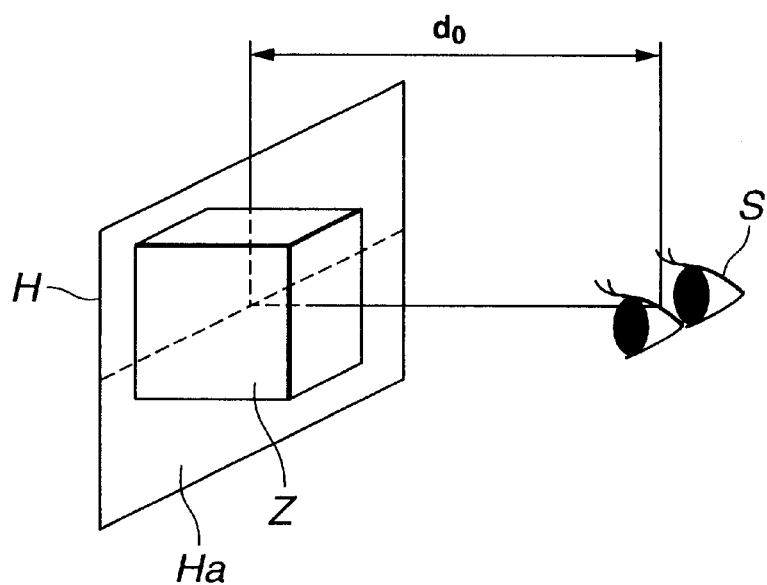
FIG. 13 explains the viewing of the hologram after subjected to the view transform.

To solve the above problem in forming a holographic stereogram H, data in an original parallax image train should be subjected to a view transform to form the reconstructed image Z near the hologram plane Ha of the holographic stereogram H as shown in FIG. 13. After the data in the parallax image train is subjected to the view transform, the reconstructed image Z having less distortion or blurring can be formed even with the observer's view S located at a position apart from the hologram plane Ha. Also, the hologram forming method according to the present invention can be applied to make the longitudinal direction of the element holograms coincide with the incident direction of the light from the illumination light source of the image reconstructing apparatus, thereby effecting the optimum view transform.

Next, the holographic stereogram forming system to form a holographic stereogram will be described below.

It should be noted that the holographic stereogram forming system which will be described below is to output a film-like hologram recording medium on which a fringe of interference between object and reference beams directly as a holographic stereogram. The holographic stereogram having the fringe of interference between object and reference beams recorded directly on the hologram recording medium is generally called "one-step holographic stereogram". That is, the holographic stereogram forming system going to be described herebelow is one example of the one-step holographic stereogram forming systems.

Figure 14:
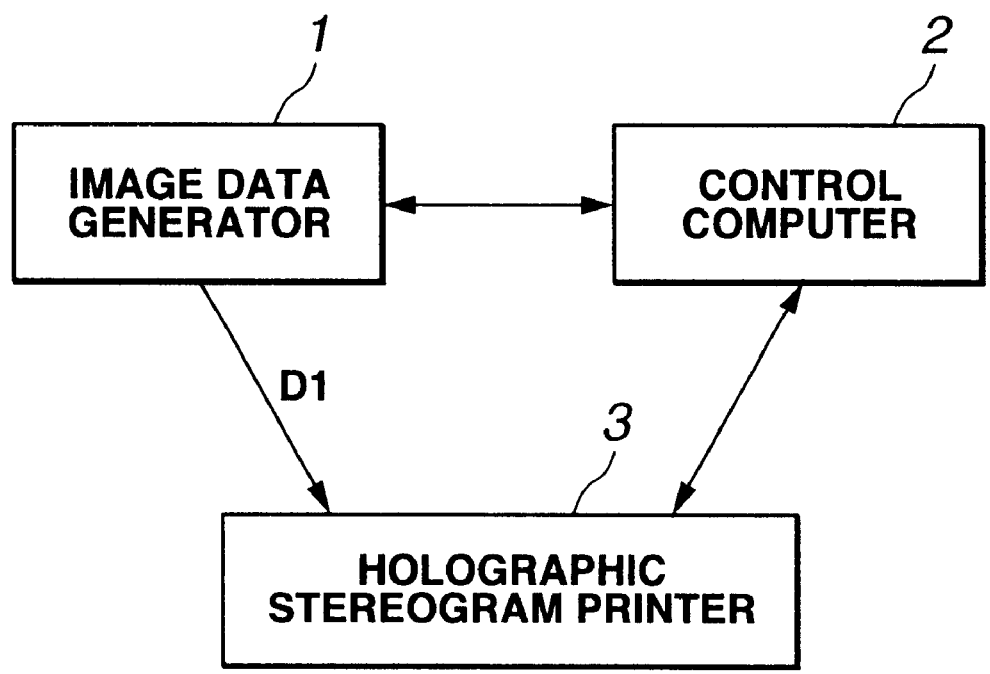
FIG. 14 is a block diagram of the holographic stereogram forming system.

Referring now to FIG. 14, there is illustrated in the form of a block diagram the holographic stereogram forming system according to the present invention. As shown, the holographic stereogram forming system includes an image data generator 1 to produce data in images to be recorded in a holographic stereogram, a control computer 2 to control the entire system, and a holographic stereogram printer 3 having an optical system for forming a holographic stereogram.

The image data generator 1 produces data in a plurality of images corresponding to a plurality of element holograms recorded in a holographic stereogram (i.e., data in a parallax image train) while changing the view transform parameters correspondingly to the movement of the light source in the image reconstructing apparatus 10 or 70.

Figure 15:
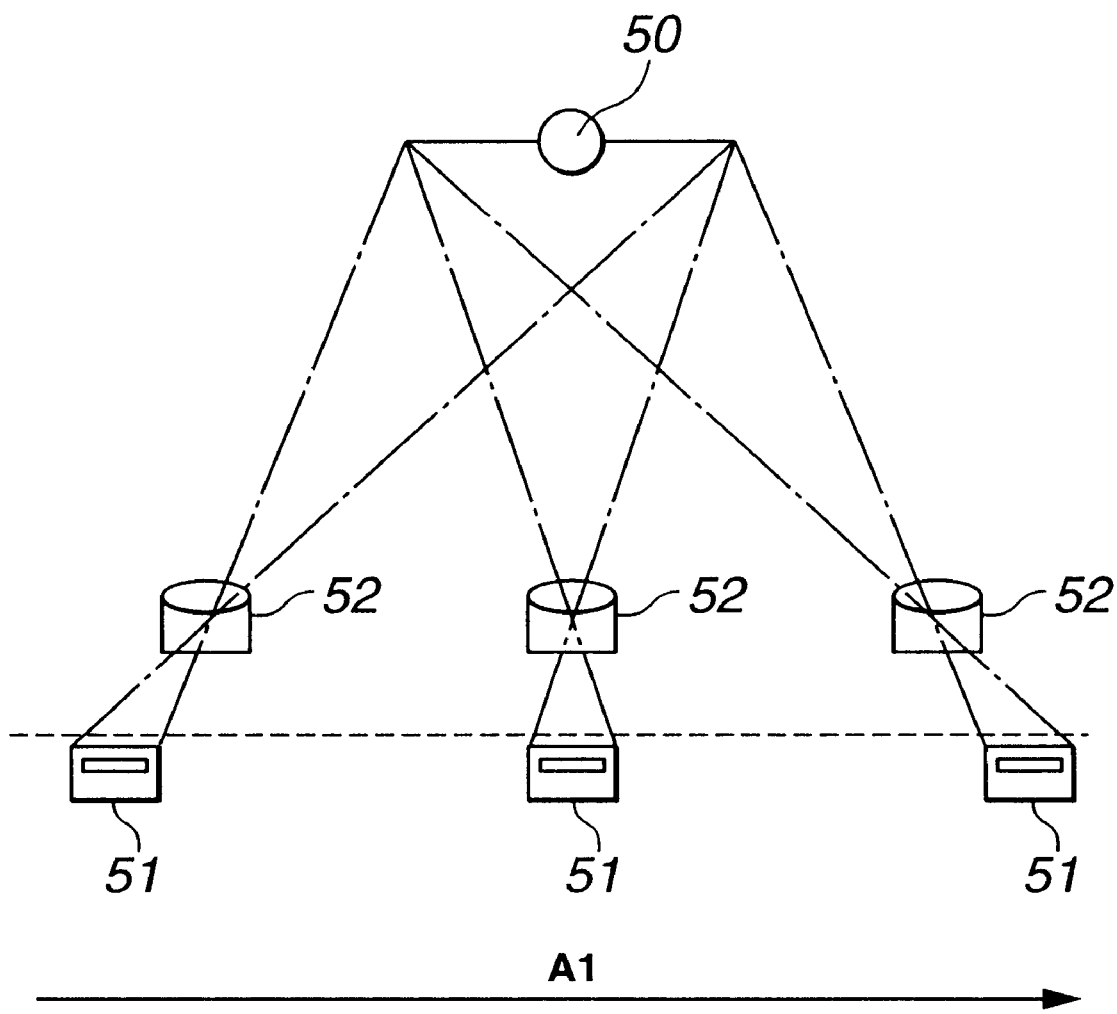
FIG. 15 explains the photography of parallax image trains by the re-centering system.

The image data generator 1 is also provided with a photographic unit to capture a parallax image train being a plurality of images from which a holographic stereogram is formed. Using the photographic unit, parallax images can be photographed in various manners. For example, as shown in FIG. 15, an object 50 is fixed and a camera 51 to photograph the object 50 is moved in parallel to the object 50 to take many pictures of the object 50 from many different positions. That is, each time one picture is taken, the camera 51 is moved at a predetermined pitch in a constant direction in parallel to the object 50 as indicated with an arrow A1 in FIG. 15. Thus, it is possible to acquire a train of parallax images having a parallax from each other in the horizontal direction.

Note that the "straight track system" having previously been described with reference to FIG. 11 may be adopted to acquire a train of parallax images but that in this holographic stereogram forming system, a lens 52 of the camera 51 is moved correspondingly to a photographing position in such a manner that the image of the object 50 is always in the center of the screen as shown in FIG. 15. This system is called "re-centering system".

To acquire a train of parallax images in practice, the camera 51 is moved at a predetermined pitch each time one image of the object 50 is captured in order to continuously change the view point of the camera 51 towards the object 50, thereby acquiring about 500 to 1,000 images. Thus, a train of many parallax images having a parallax from each other in the horizontal direction can be captured.

The above method is to acquire a train of parallax images by an actual photography. A train of parallax images for used to form a holographic stereogram may be acquired by using the computer graphics. In this case, an object and camera are virtually set in a computer graphic space, the camera is moved in parallel to the object in the similar manner to that shown in FIG. 15 to acquire many images of the object viewed from many different positions. In other words, the view point of the camera is moved at a predetermined pitch, images of the object viewed from the respective view points are rendered to provide a plurality of images different in view point from each other. In this way, a similar train of parallax images can be acquired to that acquired by the actual photography.

In the holographic hologram formed directly from the train of parallax images acquired by the photography as in FIG. 15, the geometric relation between the view point of the camera 51 and object 50 during the photography is maintained in the reconstructed image of the holographic stereogram. Therefore, when a holographic stereogram H is formed directly from the parallax image train acquired by the above photography, its reconstructed image Z will be formed at a position deeper a image pickup distance set for photography of the parallax image train than the hologram plane Ha of the holographic stereogram H. Thus, with such a holographic stereogram H, unless the reconstructed image Z is viewed with the observer's view S located in the hologram plane Ha in such a manner that the distance d0 between the reconstructed image Z and observer's view S is equal to the distance between the object 50 and view point of the camera 51 during the photography, as shown in FIG. 12, it will appear distorted or blurred.

More specifically, in the case of a holographic stereogram reconstructed by illumination with a white light, the farther the position where the reconstructed image Z is formed from the hologram plane Ha, the more blurred the reconstructed image Z will appear. Thus, if the reconstructed image Z is formed at a position deeper than the hologram plane Ha as in the above, it will appear extremely blurred.

To avoid the above, the image data generator 1 produces image data corresponding to the element holograms by changing the view transform parameters for the parallax image train acquired as in the above, correspondingly to the movement of the light source of the image reconstructing apparatus 10 or 70. As a result, the reconstructed image Z will be formed near the hologram plane Ha as shown in FIG. 13. That is, the parallax image train is subjected to a view transform corresponding to the movement of the light source in the image data generator 1 so that the reconstructed image Z is formed near the hologram plane Ha of the holographic stereogram H, and the parallax image train thus subjected to the view transform is used to form a holographic stereogram.

Thus, a train of parallax images including horizontal parallax information is recorded as a plurality of horizontally successive element holograms on a hologram recording medium 30 to provide a holographic stereogram having a horizontal parallax from one image to another.

The holographic stereogram thus formed has the view point thereof shifted over a distance between the view point and reconstructed image from in the hologram plane to the observer's eye by the view transform while the reconstructed image is also shifted over the view point-reconstructed image distance towards the observer's eye and located near the hologram plane. Therefore, an image appearing less distorted and blurred can be reconstructed from the hologram stereogram.

In the image data generator 1, the view transform parameters are changed correspondingly to a movement of the movable light source in the image reconstructing apparatus 10 or 70. Thus, the image reconstructing apparatus 10 or 70 can reconstruct a holographic stereogram with a high quality.

The above-mentioned view transform permits to form the reconstructed image Z near the hologram plane Ha as shown in FIG. 13. Thus, a sharp reconstructed image appearing less distorted and blurred can be yielded also at the observer's view S apart from the hologram plane Ha.

Thus, when recording images on the hologram recording medium, the image data generator 1 sends, for each image, the generated image data D1 in the order of recording to the hologram recording medium to the holographic stereogram printer 3. Also, each time the image data D1 for one image is sent to the holographic stereogram printer 3, the image data generator 1 sends to the control computer 2 a timing signal indicating that it has sent the image data D1.

The control computer 2 drives the holographic stereogram printer 3 according to the timing signal received from the image data generator 1 to sequentially record images based on the image data D1 generated by the image data generator 1 as rectangular element holograms onto the hologram recording medium set inside the holographic stereogram printer 3. Since the light is projected from the illumination light source of the image reconstructing apparatus 10 or 70 longitudinally of the element holograms, so the view transform is effected accordingly.

As having been described in the foregoing, a hologram positioned in place is illuminated with a light from a light source set at an optimum position and angle, whereby it is possible to enjoy to see a quality hologram. Conventionally, the hologram itself is moved for enjoying to see a change of a plurality of printed holographic images from one to the other. According to the present invention, the light source is moved in relation to the hologram in an optimum manner, whereby the relation between the hologram and angle of the illumination light is changed to permit the observer to enjoy to see a change such as a motion of the holographic image.

What is claimed is:

1. An image reconstructing apparatus for reconstructing a hologram, comprising:
    a body having a holder for holding a hologram recording medium, the recording medium having the hologram recorded thereon;
    a lid pivotally-mounted to the body; and
    a movable light source, the light source slideably mounted to the lid and movable through a range of lateral angles in relation to the hologram recording medium within a plane, the plane intersecting the hologram recording medium at a fixed angle, wherein the hologram is comprised of a plurality of element holograms recorded from parallax information of a parallax image train corresponding to different angle views of an object.

2. The apparatus as set forth in claim 1, wherein:
    the element holograms are recorded on the recording medium as rectangular elements, the major axes of said rectangular elements being arranged parallel to one another; and
    wherein the plane within which the light source is movable intersects the hologram recording medium along a line that is perpendicular to the major axes of the element holograms.

3. The apparatus as set forth in claim 1, wherein the holder of the apparatus body includes a positioning mechanism to limit the direction in which the hologram recording medium is inserted relative to the body.

4. The apparatus as set forth in claim 3, wherein the hologram recording medium includes a marking which operates in conjunction with a feature of the positioning mechanism to fix the direction in which the hologram is inserted.

5. The apparatus of claim 1, further comprising means for restricting a direction in which the hologram recording medium is held in relation to the body.

6. The apparatus according to claim 5, wherein the element holograms are recorded on the recording medium as rectangular elements, the major axes of said rectangular elements being arranged parallel to one another, wherein the means for restricting further comprises means for holding the hologram recording medium so that major axes of the rectangular element holograms are arranged perpendicular to the intersection of the plane and the hologram recording medium, whereby when the hologram recording medium is placed in the holder light from the light source is incident upon the hologram at a predetermined angle relative to the major axes of the element holograms.

7. The apparatus according to claim 1, further comprising a driving mechanism connected with the movable light source and adapted to move the light source relative to the lid.

8. The apparatus according to claim 7, wherein the driving mechanism further comprises a motor.

9. A hologram viewing method for viewing a hologram formed by recording a plurality of element holograms on a hologram recording medium, the method comprising:
    forming the element holograms on the recording medium from parallax information of a parallax image train, the parallax image train corresponding to different angle views of an object;
    inserting the recording medium into a holder body, the holder body including a pivotally-mounted lid and a light source slideably mounted to the lid, the light source movable through a range of lateral angles in relation to the inserted hologram recording medium within a plane, the plane intersecting the hologram recording medium at a fixed angle;
    illuminating the hologram recording medium with light from the light source; and
    reproducing a hologram image by moving the light source through the range of lateral angles.

10. The hologram viewing method according to claim 9, wherein the plurality of element holograms are recorded on the recording medium as rectangular elements, the major axes of said rectangular elements being arranged parallel to one another, and wherein the plane within which the light source is movable intersects the hologram recording medium along a line that is perpendicular to the major axes of the element holograms.

* * * * *